Jan. 19, 1965  SAZO ANDO  3,165,992
SIGNAL-LENS REFLEX CAMERA
Filed Sept. 19, 1961  4 Sheets-Sheet 1

United States Patent Office 3,165,992
Patented Jan. 19, 1965

3,165,992
SINGLE-LENS REFLEX CAMERA
Sazo Ando, Gamagori-shi, Japan, assignor to Kowa Company, Ltd., Naka-ku, Nagoya, Japan, a corporation of Japan
Filed Sept. 19, 1961, Ser. No. 139,168
8 Claims. (Cl. 95—42)

The present invention relates to improvements in or relating to single-lens reflex cameras particularly of the type having an intra-lens shutter.

With previous single-lens reflex cameras of this type, having incorporated both a mirror and a light shielding plate, it has been extremely difficult to obtain a desired sequential operation including either the rising or falling of the mirror and light shielding plate with an exposure motion of the shuttter between the movements.

Another difficulty met with previous single-lens reflex cameras has been a fact that they lack any dependable and accurate safety device which is effective to prevent a double release and to lock the film winding mechanism against inadvertent operation.

The present invention is intended to overcome these difficulties previously met with single-lens reflex cameras of the type described.

The primary object of the present invention is to provide a single-lens reflex camera of the kind described which is capable of effecting an automatic sequential operation including the closing of the shutter, rise of the mirror and light shielding plate, exposure motion of the shutter, fall of the mirror and light shielding plate and the opening of the shutter in that order, such operation being started simply by operation of a starting member provided for the purpose.

Another object of the present invention is to effect such sequential operation in properly timed relation to keep the film loaded from exposure to light except at the time of exposure intended.

A further specific object of the present invention is to provide a driving mechanism for single-lens reflex cameras of the kind described especially designed to enable such sequential operation to be effected in properly timed relation.

According to the present invention, there is provided a single-lens relex camera of the kind described comprising an operating member arranged in interengaging relation with the shutter mechanism of the camera and a setting member engaged by a drive spring and a restoring spring in a manner so as to store when set an energy for restoring the setting member itself and an energy for driving said operating member, said operating member being operatively connected through a driving mechanism with the mirror and the light-shielding plate of the camera in a manner so that upon release of said driving energy said operating member is started in movement to effect a sequence of operations including the closing of the shutter, the raising of the mirror and subsequently the light-shielding plate and the releasing of said restoring energy, said releasing of said restoring energy being effective to start another sequence of operations including the restoring of said setting member, the reversal of movement of said operating member and the restoring of the mechanism associated therewith to its normal position.

According to the present invention, there is also provided a single-lens reflex camera of the kind described an operating member arranged in interengaging relation with the shutter mechanism of the camera and a setting member engaged by a drive spring and a restoring spring in a manner so as to store, when in an activated position, energy for restoring the setting member itself and energy for driving said operating member, said operating member being operatively connected through a driving mechanism with the mirror and the light-shielding plate of the camera in a manner so that upon release of said driving energy said operating member is started in movement to effect a sequence of operations including the closing of the shutter, the raising of the mirror and subsequently the light-shielding plate and the releasing of said restoring energy, said releasing of said restoring energy being effective to start another sequence of operations including the restoring of said setting member, the reversal of movement of said operating member and the restoring of the mechanism associated therewith to its normal position, said driving mechanism being arranged to drive the mirror and the light-shielding plate in sequence such that when the plate and mirror are raised the mirror is first operated and then the light-shielding plate is operated after completion of the mirror operation whereas when the plate and mirror are lowered the light-shielding plate is first operated and then the mirror is operated after completion of the operation of the light-shielding plate. The camera further comprises a safety device for the film-winding mechanism including a pair of operatively interconnected pivotal levers biased to rotate in opposite directions, cam means mounted on the winding shaft of said winding mechanism, one of said pivoted levers being arranged to engage with said cam means and the shutter releasing button of the camera, and a member adapted to operate subsequently to the operation of the mirror and the light-shielding plate when the shuttter is operated and engageable with the other pivotal lever.

According further to the present invention, there is provided a single-lens reflex camera of the kind described comprising an operating member adapted to effect reciprocatory movement, a lever mechanism associated with said operating member so as to be operated through a selected part of either of the forward and backward strokes of said reciprocatory movement of said operating member to cause desired vertical movement of the mirror and the light-shielding plate of the camera, and a safety device for the film-winding mechanism of the camera including a pair of operatively interconnected pivotal levers biased to rotate in opposite directions, cam means mounted on the winding shaft of said winding mechanism, one of said pivotal levers being arranged to engage said cam means and the shutter releasing button of the camera, and a member adapted to operate subsequently to the operation of the mirror and the light-shielding plate when the shutter is operated and engageable with the other pivotal lever.

These and other objects, features and advantages of the present invention will become apparent from the following detailed description of the invention when read in connection with the accompanying drawings, which diagrammatically illustrate some preferred embodiments of the invention.

Figure 1:
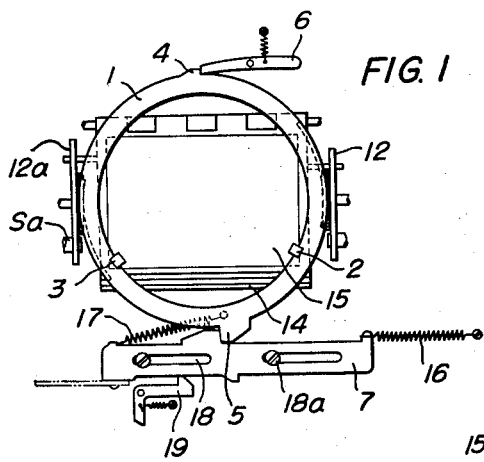
FIG. 1 is a schematic front view of the operating mechanism embodying the present invention showing essential members thereof as positioned before the mechanism has been set.
Figure 2:
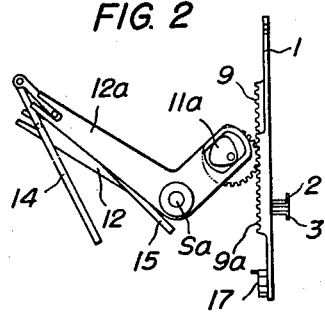
FIG. 2 is a schematic side elevation of same.
Figure 4:
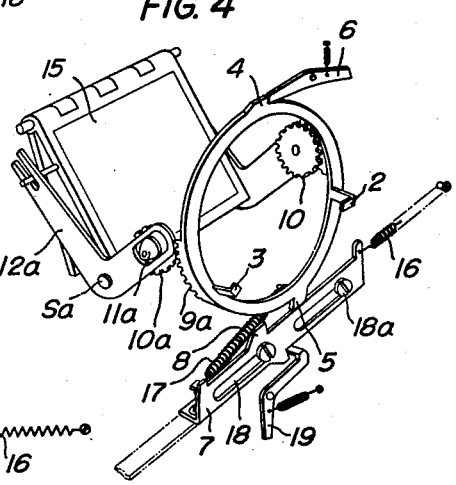
FIG. 4 is a schematic perspective view of the same in activated position.

Referring now to the drawings, numeral 1 denotes an operating member in the form of an annular ring formed with engaging lugs 2, 3 and engaging shoulders 4, 5. One of the engaging shoulders 4 is adapted to abut a detent lever 6 and the other engaging shoulder is adapted to abut against a shoulder 8 formed on a setting member 7. Also formed on the member 1 are arcuate toothed racks 9 and 9a adapted to mesh with gears 10 and 10a each rotatably mounted on a stationary member (not shown). The shafts of the gears 10, 10a have cams 11 and 11a, respectively, firmly secured thereto. One of the cams 11 is engagingly received in an opening 13 formed in one end of a crank lever or L-shaped lever 12 mounted for pivotal movement about a pivot stud S while the other cam 11a is engagingly received in an opening 13a formed in one end of a crank lever 12a mounted for pivotal movement about a pivotal stud Sa. The lever 12 is connected at the other end with a light shielding plate 14 while the lever 12a is connected at the other end with a mirror 15.

Numeral 16 denotes a spring arranged in tension between the member 7 and a stationary member, not shown, for biasing the member 7. Numeral 17 denotes a drive spring for the operating member 1 and secured at one end to the member 7 and at the other end to the operating lever 1. Numeral 18 denotes a guide slot formed in the member 7; 18a a guide stud; and 19 a detent for checking return of the member 7.

Figure 8:
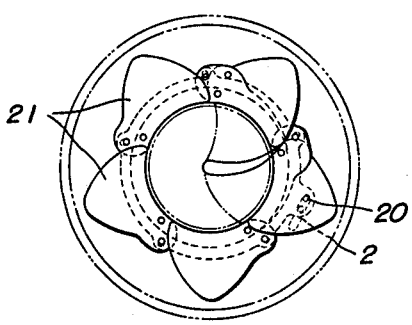
FIGS. 8 and 9 are diagrammatic front elevations showing the blade portion and the operating ring portion, respectively, of a shutter mechanism.
Figure 9:
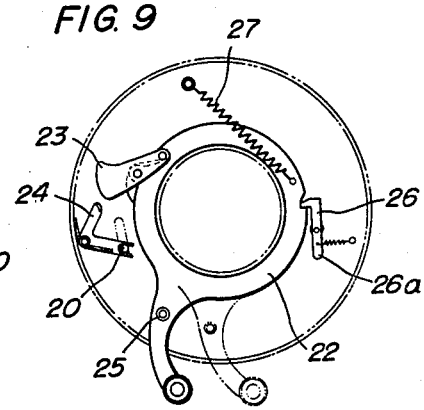

Referring next to FIGS. 8 and 9, which illustrate a well-known intra-lens shutter mechanism, numeral 20 denotes an operating pin for effecting opening and closing movement of the shutter blades 21, said operating pin being disposed so as to be engaged by one of said engaging lugs 2 on the operating member 1. Numeral 22 denotes an operating ring adapted to actuate said pin 20 by way of a piece 23 and a lever 24. Numeral 25 denotes a stud mounted on the ring 22, numeral 26 denoting a detent lever for restraining the rotation of the ring 22. Stud 25 is disposed to be engaged by said detent 19 while said lug 3 is disposed to be engaged by the detent 26. Numeral 27 denotes a spring for energizing said operating ring 22.

Figure 10:
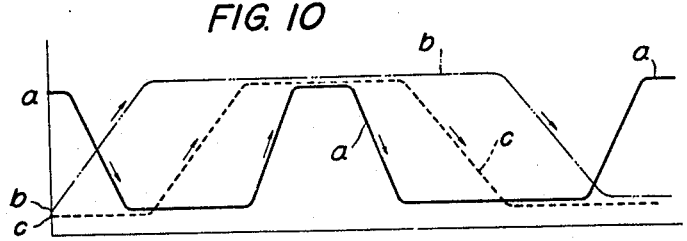
FIG. 10 is a graphical representation of the time sequence of the camera operation according to the invention.

FIG. 10 illustrates the time sequence of operations of the shutter, mirror and light shielding plate according to the present invention. In this figure, curves a, b and c represent the motions of the shutter, mirror and light shielding plate, respectively. The upwardly directed arrows indicate rise or opening motion of the associated members while the downwardly directed arrows indicate fall or closing thereof.

Figure 3:
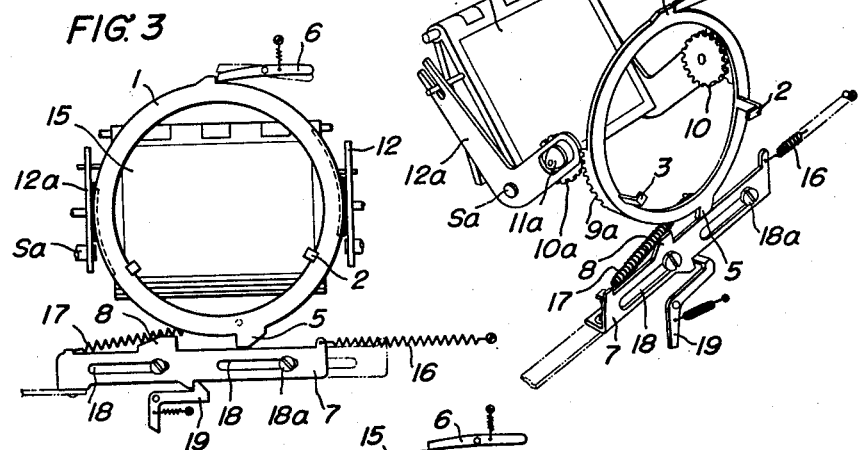
FIG. 3 is a view similar to FIG. 1, but showing parts in activated position.
Figure 5:
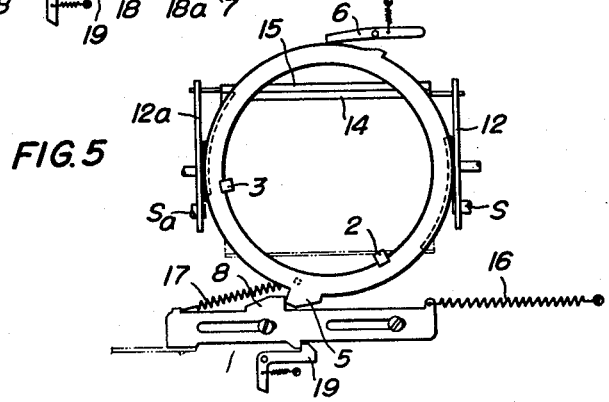
FIG. 5 is a view similar to FIGS. 1 and 3, but showing the mirror and the light shielding plate as raised by the operating member according to the invention.
Figure 6:
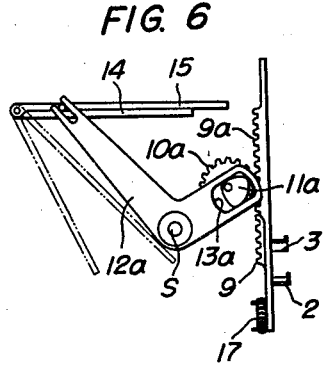
FIG. 6 is a side elevation corresponding to FIG. 5.
Figure 7:
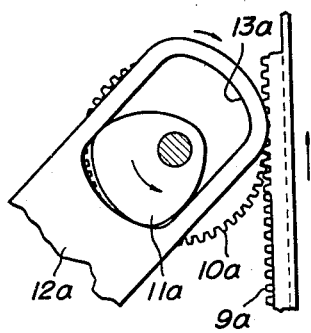
FIG. 7 is a cross-sectional side elevation of the cam portion of the drive mechanism.

In operation, the member 7 and the ring 22 are first set in association with the operation of the film winding mechanism or by any other desired manner. The member 7 is moved from the position in FIG. 1 to that in FIG. 3 to build up a restoring and an operating energy in springs 16 and 17, respectively. The energized state is maintained by the abutting engagement of the detent 19 with the member 7. The ring 22 is positioned as indicated by the solid lines in FIG. 9 being held there by the detent lever 26. In this situation, as the detent lever 6 is depressed by a suitable starting member, for example, such as a shutter button, to be disengaged from the operating member 1, the latter is rotated clockwise under the bias of the spring 17. As a result, the lug 2 disengages the pin 20 to allow the shutter blades to move to the closed position, and the racks 9, 9a formed on the ring 1 act to rotate the cams 11 and 11a through the respective gears 10 and 10a in opposite directions thereby to pivotally move the levers 12 and 12a in the same direction to raise the extremities thereof since the cams 11, 11a are symmetrically disposed relative to the respective levers 12, 12a so as to actuate the latter in the same direction. The rise of the lever extremities acts to raise the mirror and the light shielding plate. In this case, the cams 11 and 11a are arranged relative to the respective levers 12, 12a in a manner such that the mirror is first raised and as it completes the upward movement the light shielding plate 14 begins to rise. Thus, the cams have their respective camming surfaces angularly positioned relative to the associated levers so as to operate in the first and second halves of the work stroke of the operating member, respectively. In other words, the cam 11a for actuating the mirror acts upon the associated lever 12a from the start and through the first half of the movement of the member 1 and remains idle through the second half of such movement. On the other hand, the cam 11 for actuating the light shielding plate is held ineffective through the first half of the movement of the member 1 starting to act upon the associated lever at the end of the first half movement. Further, at the end of the movement of the operating member 1, the lug 3 carried thereby is brought into engagement with the detent 26 to allow the ring 22 to operate whereby an exposure is effected at the same time when the ascent of the light shielding plate following the mirror is completed. At the end of action of the ring 22, the pin 25 on the ring comes into engagement with the detent 19 to disengage the latter from the member 7 to allow the member to return under the bias of the spring 16. The returning movement of the member 7 causes the operating member 1 to move in a direction opposite to the previous one through the interengagement of the shoulders 5 and 8 to the initial position. The reverse movement of the member 1 causes the cams 11, 11a to rotate in the opposite direction so that one of the cams 11 is effective now through the first half movement of the operating member 1 while the other cam 11a is effective through the second half movement thereof. Thus, now the light shielding plate 14 descends preceding the mirror 15, which starts to descend just when the descent of the plate 14 has been completed. It will be understood that the lug 2 engages the pin 20 at the end of the first half of the reverse rotative movement of the member 1 to move the pin to open the shutter blades 21.

As apparent from the foregoing, according to the present invention, a picture-taking operation including the rise of the mirror and light shielding plate and the exposure motion followed by the fall of the mirror and light shielding plate is consecutively effected in a fully automatic manner, rendering the picture-taking operation of the intra-lens type single-lens reflex camera accurate, dependable and convenient.

In addition, such automatic operation according to the present invention includes sequential rising and falling movements of the mirror and light shielding plate taking place in a manner so that any light entering the camera casing through the view finder is effectively prevented from reaching the film face during such operation of the mirror and light shielding plate. In other words, the operation of the single-lens reflex camera according to the present invention is fully automatic and practically advantageous in that any danger of a beam of light reaching the film face through the view finder is completely eliminated since it is arranged so that during the rising stroke the light shielding plate remains shielding the film face until the mirror has been moved to shield or close the view finder while during the falling period the mirror remains shielding the view finder until the light shielding plate has been moved to cover the film face.

In addition, in order to ensure such sequential movements of the mirror and the light shielding plate, according to the present invention, the drive mechanism therefor is so arranged as to cause vertical movements of the mirror and the light shielding plate by way of a lever means adapted to operate at all times in association with the reciprocatory movement of the operating member, whereby not only the vertical movements of the mirror and the light shielding plate may be effected simply by the reciprocatory movement of the operating member in a positive and accurate way in both the ascending and descending directions but also such movements of the mirror and the light shielding plate may be effected with ease in a sequential manner as desired.

Another aspect of the present invention will now be described in detail with reference to FIGS. 11 to 15.

Figure 11:
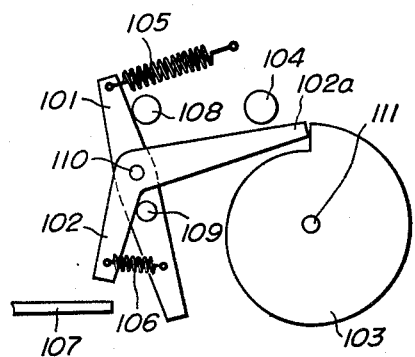
FIG. 11 is a diagrammatic illustration of the safety device according to the present invention with the winding shaft restored to its normal position after the device has been activated.

Referring particularly to FIG. 11, levers 101 and 102 are supported by a pin 110 for pivotal movement independently of each other. Secured to one end of the lever 101 is a spring 105 secured at the other end to the camera frame normally to urge the lever clockwise. The clockwise rotation of the lever 101 is limited by a stop stud 108 secured to the camera frame. The lever 102 is urged to rotate counterclockwise by a spring 106 secured at one end to the lever 101 and at the other end to the adjacent end of the lever 102. A stop stud 109 carried by the lever 101 serves to limit the counter-clockwise rotation of the lever 102.

A cam 103 is secured to the winder shaft 11 and has a notch or shoulder 103a formed on the periphery of the cam 103 and engageable by the adjacent end of the lever 102 to limit the rotation of the winder shaft 111.

Numeral 107 denotes a member adapted to be moved lastly or immediately after the operation of the mirror and the light shielding plate when the shutter is operated, and numeral 104 denotes the rod of the shutter button.

Figure 12:
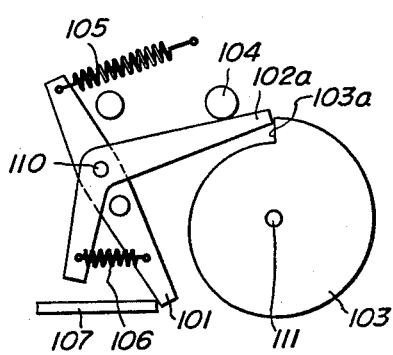
FIG. 12 is a similar view of the device with the shutter button held depressed after it has been operated to release the shutter.

Upon depression of the shutter button 104, a sequential operation takes place including the last stage where the lever 107 is restored to the position shown in FIG. 12. On this occasion, the lever 107 comes to stop rotating the lever 101 in a counterclockwise direction through a previously adjusted angle against the action of the spring 105. Also on this occasion, though the lever 102 tends to rotate together with the lever 101, the lever 102 is restrained by one end of the shutter button rod halfway of the rotation so that the spring 106 arranged between the two levers is extended to space the stud 109 apart from the lever 102, as shown in FIG. 12. In this state, the lever 102 is still in engagement with the notch 103a in the cam 103 holding the winder shaft against counterclockwise rotation.

Figure 13:
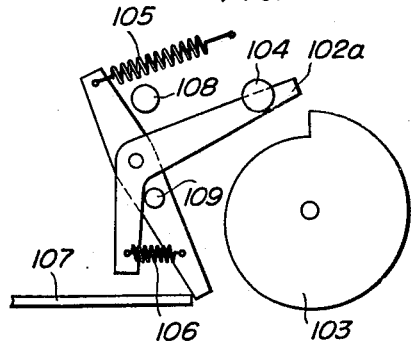
FIG. 13 is a similar view with the shutter button released.

Referring next to FIG. 13, upon release of the shutter button 104, the lever 102 which has been restrained by the adjacent end of the button 104 is released to rotate counterclockwise under the bias of the spring 106 so that the end 102a of the lever 102 is disengaged from the notch 103a formed in the cam 103 again to make the winder shaft 111 free to rotate. In this state, the adjacent end of the lever 102 is positioned under the end of the shutter button rod 104 thereby to keep the latter from being depressed.

Figure 15:
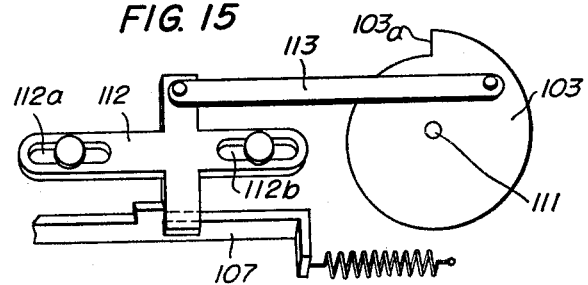
FIG. 15 is a diagrammatic perspective view of the setting mechanism.
Figure 16:
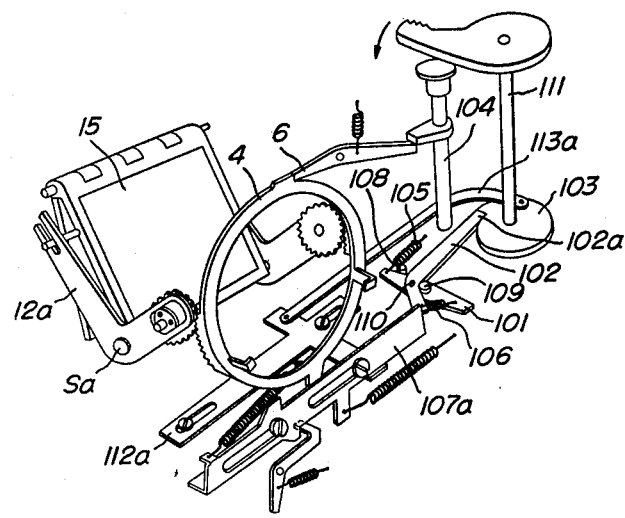
FIG. 16 is a perspective view of an embodiment of the present invention in combination of the operation mechanism substantially same with that shown in FIG. 4 and the setting mechanism similar to that shown in FIG. 15.

Referring to FIG. 15, as the shaft 111 is rotated counterclockwise, a connecting link 113 secured at one end to the cam 103 is actuated to translate a setting lever 112 to set the lever 107. The lever 107 thus set is restrained by a detent, not shown, against returning movement, though the winder shaft is reversely rotated to its initial position after its forward or counterclockwise rotation through a suitable angle for setting the lever 107.

Figure 14:
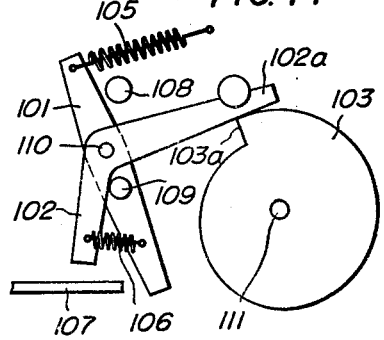
FIG. 14 is a view of the device while it is being activated.

Referring to FIG. 14, as the lever 107 is moved to the left to be set as described hereinbefore, the lever 101 which as previously been restrained by the adjacent end of the lever 107 is allowed to rotate clockwise under the bias of the spring 105 until the stud 109 carried by the lever abuts against the lever 102 which now overlies the cam 103 as shown. In this position, the lever 102 is still under the shutter button 104 to prevent the latter from being depressed.

After the setting operation, as the winder shaft 111 is restored to its initial angular position, the lever 102 which has previously been held against rotation by the cam 103 will be released just when the shoulder 103a on the cam 103 moves past the extremity 102a of the lever 102. The lever 102 thus released rotates clockwise together with the lever 101 under the bias of the spring 105 until the lever 101 abuts against the stop stud 108. At this time, as observed in FIG. 11, the extremity 102a of the lever 102 is again received in the notch 103a of the cam 103 to restrain the rotation of the winder shaft 111 while the lever 102 is moved from beneath the shutter button 104, again allowing the latter to be depressed.

It will be appreciated from the foregoing that, according to the aspect of the present invention, the film can be wound only after a predetermined sequence of operations has been completed or after the mirror has returned to its initial position, and that the shutter button can be released only after the winder shaft has been restored to its initial position upon completion of the setting operation.

While the present invention in its broad and specific aspects has been shown and described in connection with certain specific embodiments thereof, it is to be understood that these are by way of examples rather than limitation, and that the invention is designed or comprehended within the appended claims.

What is claimed is:

1. A single-lens reflex camera having a shutter, a shutter release button, a mirror, a light-shielding plate and a film-winding mechanism, said camera comprising a setting member supported for reciprocatory movement, an operating member supported for movement between first and second positions, means providing connection between the setting member and the operating member to cause the latter to be moved between the first and second positions thereof during a selected portion of the forward and backward strokes of said reciprocatory movement of said setting member, means connecting said mirror and light-shielding plate with said operating member to cause movement of the mirror and the light-shielding plate in accordance with movement of said operating member, and a safety device for the film-winding mechanism of the camera including a pair of operatively interconnected pivotal levers biased to rotate in opposite directions, cam means mounted on said winding mechanism, one of said pivotal levers being arranged to engage with said cam means and the shutter release button, and a member adapted to operate subsequently to the operation of the mirror and the light-shielding plate with the shutter operated and engageable with the other of the pivotal levers.

2. In a single-lens reflex camera having a shutter, a mirror, and a light-shielding plate, a rotatably supported operating member, a setting member slidably supported for movement between active and released positions, means operatively connecting said mirror and light-shielding plate to said operating member to cause sequential movement of said mirror and light-shielding plate in opposite directions in dependence upon the direction of rotation of said operating member, spring means between said member and said operating member and energized with said member in the active position and effective to rotate the operating member in a first direction to operate the mirror and light-shielding plate, further spring means connected to said setting member for returning the same to said released position, and shoulder means respectively on said operating member and said setting member to cause rotation of the operating member in a direction opposite to said first direction as said setting member returns to the released position thereof.

3. In a single-lens reflex camera having a shutter, a mirror, and a light-shielding plate, an operating member movable between first and second positions, a setting member slidably supported for movement between active and released positions, detent means releasably retaining said operating member in said first position, spring means between said operating member and said setting member for moving said operating member to said second position with the setting member means in said active position and the detent means released, means connecting said operating member to said mirror and light-shielding plate to first raise the mirror to a final upward position and then raise the light-shielding plate all in response to movement of said operating member from said first to said second position, further spring means engaging said setting member to return the latter to the released position thereof, means on said setting member for engaging the operating member when the setting member is in active position for returning the operating member to said first position thereof as said setting member returns to said released position, said means which connects said operating member to said mirror and light-shielding plate being effective in response to movement of said operating member from said second to said first position to first lower the light-shielding plate to a final lowered position and then lower the mirror.

4. In a camera as claimed in claim 3 wherein said operating member is a ring and said mirror and light-shielding plate are respectively independently pivotally supported, said means which connects said operating member to said mirror and light-shielding plate including first and second levers respectively connected to said mirror and light-shielding plate for pivotally moving the same, and cams connected between said operating member and said mirror and light-shielding plate respectively for sequentially operating the latter in response to the direction of movement of said operating member.

5. In a camera as claimed in claim 4 wherein said operating member is supported for rotary movement, said means which connects said operating member to said mirror and light-shielding plate further comprising a pair of arcuate toothed racks on said operating member, and a rotatably supported gear in mesh with a respective rack, said cams being fixedly secured to the gears and in engagement with said first and second levers to activate the latter and the mirror and light-shielding plate therewith.

6. In a camera as claimed in claim 3 comprising a releasable detent for said setting member to hold the latter in said active position, spring loaded shutter means adapted for being energized by a film-winding operation, an engaging lug on said operating member for releasing the shutter means as said operating member is moved from said first position towards said second position, and means on said shutter means for engaging and releasing the detent for said setting member with said shutter means released.

7. A single-lens reflex camera having a shutter, a mirror and a light-shielding plate, said camera comprising a rotatable operating member in interengaging relation with the shutter for actuating the same, detent means for said operating member movable between a release position and an engaged position to respectively release the operating member and hold the operating member against rotation, a setting member supported for sliding movement between an activated position and a released position, detent means for the setting member movable between an engaged position and a release position, the latter said detent means in the engaged position holding the setting member in the activated position thereof whereas said detent means in the released position is disengaged from the setting member thereby leaving the latter free for sliding movement, a drive spring between said setting member and said operating member for storing energy to rotate the operating member when the setting member is in the activated position and the detent means for the operating member is moved to the release position, a restoring spring connected to said setting member for storing energy for restoring the setting member to the released position thereof when the detent means for the setting member is in release position, means operatively coupling the operating member and the setting member to cause the operating member to be driven in rotation by the setting member, in a reverse direction to that caused by the drive spring, as the setting member returns to the released position thereof under the action of the restoring spring, means operatively connecting said operating member with the mirror and the light-shielding plate such that upon rotation of said operating member by the action of the drive spring a sequence of operations is effected including the closing of the shutter, the raising of the mirror and subsequently the light-shielding plate and thereafter the releasing of said detent means for the setting member which is effective to start another sequence of operations including the restoring of said setting member to the released position thereof under the action of the restoring spring, reverse rotation of said operating member to the original release position thereof and the restoring of the light-shielding plate and the mirror to the normal positions thereof.

8. A single-lens reflex camera having a shutter, a mirror and a light-shielding plate, said camera comprising a rotatable operating member in interengaging relation with the shutter for actuating the same, detent means for said operating member movable between a release position and an engaged position to respectively release the operating member and hold the operating member against rotation, a setting member supported for sliding movement between an activated position and a released position, detent means for the setting member movable between an engaged position and a release position, the latter said detent means in the engaged position holding the setting member in the activated position thereof whereas said detent means in the released position is disengaged from the setting member thereby leaving the latter free for sliding movement, a drive spring between said setting member and said operating member for storing energy to rotate the operating member when the setting member is in the activated position and the detent means for the operating member is moved to the release position, a restoring spring connected to said setting member for storing energy for restoring the setting member to the released position thereof when the detent means for the setting member is in release position, means operatively coupling the operating member and the setting member to cause the operating member to be driven in rotation by the setting member, in a reverse direction to that caused by the drive spring, as the setting member returns to the released position thereof under the action of the restoring spring, means operatively connecting said operating member with the mirror and the light-shielding plate such that upon rotation of said operating member by the action of the drive spring a sequence of operations is effected including the closing of the shutter, the raising of the mirror and subsequently the light-shielding plate and thereafter the releasing of said detent means for the setting member which is effective to start another sequence of operations including the restoring of said setting member to the released position thereof under the action of the restoring spring, reverse rotation of said operating member to the original release position thereof and the restoring of the light-shielding plate and the mirror to the normal positions thereof, said means operatively connecting the operating member with the mirror and the light-shielding plate being effective to raise the mirror first and thereafter raise the light-shielding plate after completion of the raising of the mirror, the latter means causing lowering of the light-shielding plate first and thereafter lowering of the mirror after completion of the lowering of the light-shielding plate, the camera further having a film-winding mechanism and a shutter release button and further comprising a safety device for the film-winding mechanism including a pair of operatively inter-connected pivotal levers biased to rotate in opposite directions, cam means mounted on said winding mechanism, one of said pivotal levers being arranged to engage said cam means and the shutter release button, and a member adapted to operate subsequently to the operation of the mirror and the light-shielding plate when the shutter is operated and engageable with the other pivotal lever.

References Cited by the Examiner
UNITED STATES PATENTS

| | | | |
|---|---|---|---|
| 2,356,880 | 8/44 | Pignone | 95—42 |
| 2,730,025 | 1/56 | Faulhaber | 95—42 |
| 2,925,023 | 2/60 | Harter | 95—42 |
| 2,925,764 | 2/60 | Sauer | 95—42 |
| 3,027,819 | 4/62 | Reiche | 95—42 |
| 3,062,118 | 11/62 | Starp | 95—42 |

NORTON ANSHER, *Primary Examiner.*

JOHN M. HORAN, *Examiner.*